(12) United States Patent
Stewart et al.

(10) Patent No.: US 9,688,052 B1
(45) Date of Patent: Jun. 27, 2017

(54) THERMAL PROTECTION SUPPLEMENT FOR REDUCING INTERFACE THERMAL MISMATCH

(71) Applicant: The United States of America as Represented by the Administrator of the National Aeronautics & Space Administration (NASA), Washington, DC (US)

(72) Inventors: David A. Stewart, Santa Cruz, CA (US); Daniel B. Leiser, San Jose, CA (US)

(73) Assignee: The United States of America as Represented by the Adminstrator of the National Aeronautics and Space Administration, Washington, DC (US)

( * ) Notice: Subject to any disclaimer, the term of this patent is extended or adjusted under 35 U.S.C. 154(b) by 395 days.

(21) Appl. No.: 14/010,355

(22) Filed: Aug. 26, 2013

Related U.S. Application Data

(60) Provisional application No. 61/777,833, filed on Mar. 12, 2013.

(51) Int. Cl.
*B32B 5/14* (2006.01)
*B32B 7/02* (2006.01)

(52) U.S. Cl.
CPC ............ *B32B 7/02* (2013.01); *B22F 2203/05* (2013.01); *B22F 2207/17* (2013.01); *C04B 2235/775* (2013.01); *C04B 2237/58* (2013.01)

(58) Field of Classification Search
None
See application file for complete search history.

(56) References Cited

U.S. PATENT DOCUMENTS

| | | | |
|---|---|---|---|
| 3,795,524 A | 3/1974 | Sowman | |
| 4,093,771 A * | 6/1978 | Fletcher | .................. C03C 1/00 427/215 |
| 4,124,732 A | 11/1978 | Leger | |
| 4,582,748 A | 4/1986 | Eastes et al. | |
| 4,605,594 A | 8/1986 | Owens et al. | |
| 4,732,878 A | 3/1988 | Everitt et al. | |
| 4,797,378 A | 1/1989 | Sowman | |
| 4,798,814 A | 1/1989 | Everitt et al. | |

(Continued)

OTHER PUBLICATIONS

3M Nextel Product Information: http://www.3m.com/market/industrial/ceramics/pdfs/Nextel_Tech_Notebook_11.04.pdf (2015).*

*Primary Examiner* — David Sample
*Assistant Examiner* — Nicole T Gugliotta
(74) *Attorney, Agent, or Firm* — Christopher J. Menke; Rhys W. Cheung; John F. Schipper

(57) ABSTRACT

A thermal protection system that reduces a mismatch of thermal expansion coefficients CTE between a first material layer (CTE1) and a second material layer (CTE2) at a first layer-second layer interface. A portion of aluminum borosilicate (abs) or another suitable additive (add), whose CTE value, CTE(add), satisfies (CTE(add)−CTE1)(CTE(add)−CTE2)<0, is distributed with variable additive density, $\rho(z; add)$, in the first material layer and/or in the second material layer, with $\rho(z;add)$ near the materials interface being relatively high (alternatively, relatively low) and $\rho(z;add)$ in a region spaced apart from the interface being relatively low (alternatively, relatively high).

14 Claims, 5 Drawing Sheets

(56) References Cited

U.S. PATENT DOCUMENTS

| | | | |
|---|---|---|---|
| 4,804,642 A | 2/1989 | Ray | |
| 4,929,578 A | 5/1990 | Sowman | |
| 5,017,316 A | 5/1991 | Sowman | |
| 5,183,785 A | 2/1993 | Readey | |
| 6,225,248 B1 * | 5/2001 | Leiser | C04B 38/0045 428/293.4 |
| 6,797,406 B2 * | 9/2004 | Matsudate | C22C 38/08 148/529 |
| 7,314,648 B1 * | 1/2008 | Stewart | C23C 30/00 427/299 |
| 7,767,305 B1 * | 8/2010 | Stewart | B64G 1/58 428/408 |
| 2011/0236713 A1 * | 9/2011 | Radwan | B22F 7/06 428/610 |
| 2012/0225767 A1 * | 9/2012 | Imholt | B29D 11/00 501/1 |

* cited by examiner

US 9,688,052 B1

THERMAL PROTECTION SUPPLEMENT FOR REDUCING INTERFACE THERMAL MISMATCH

This application claims the benefit of U.S. provisional application No. 61/777,833, filed Mar. 12, 2013.

ORIGIN OF THE INVENTION

The invention described herein was made by employees of the United States Government and may be manufactured and used by or for the Government of the United States of America for governmental purposes without the payment of any royalties thereon or therefore.

FIELD OF THE INVENTION

This invention relates to thermal protection compositions that can survive for up to 600 sec at temperatures up to 3200° F. (1760° C.) and can permit reduction of thermal expansion mismatch across a material interface.

BACKGROUND OF THE INVENTION

The material aluminum borosilicate ("abs"), includes selected fractions of alumina ($Al_2O_3$), boria ($B_2O_3$) and silica ($SiO_2$), and was studied experimentally by H. Sowman in or around 1970 and disclosed in U.S. Pat. No. 3,795,524 (the "Sowman patent"). The Sowman patent focuses on a particular trapezoid (ABCD) in the phase diagram for $Al_2O_3$, $B_2O_3$ and $SiO_2$, illustrated in the Sowman patent, FIG. 1, which extends from a boundary line segment connecting the vertices $Al_2O_3$ and $B_2O_3$ to a second boundary line adjacent to the $SiO_2$ vertex (approximately 65 percent weight fraction $SiO_2$ and the remainder a mixture of $Al_2O_3$ and $B_2O_3$. Continuous fibers of abs, up to 600 cm in length, with diameters of about 15 μm, can be produced by a variation of the Sowman patent process at temperatures of about 900° C. (1652° F.) Amorphous abs is produced at temperatures as low as 600° C. (1040° F.) and is more likely to form near the $Al_2O_3$—$B_2O_3$ and boundary line segment in the abs phase diagram.

Largely crystalline abs (e.g., $9Al_2O_3+2B_2O_3$, confirmed by X-ray diffraction) is produced at temperatures of 1200° C. (2120° F.) and above. A material composition that is predominantly $3Al_2O_3+B_2O_3$ is preferred for some applications. At these higher temperatures and/or for abs compositions lying further from the boundary line segment $Al_2O_3$—$B_2O_3$ in the abs phase diagram, the resulting abs tends to be more porous, to be more fragile, to have a reduced elasticity modulus, to begin to lose its optical transparency, and to become more opaque. An abs compound can be formed as an aqueous solution or as a two-phase solution (mixture of colloidal dispersion and water-soluble alumina and boria). An aqueous solution can be used to produce abs fibers if the solution is first made denser and more viscous and converted to a gel. Fibers of abs can be woven into a fabric-like material.

For thermal protection of a re-entering space vehicle, where the leading edges may experience temperatures up to T=3200° F. (1760° C.) for time intervals as long as 600 sec, a material or additive is needed that will survive under these conditions and will maintain reasonably good radiation emittance to aid in partial cooling of the leading edges. The material should also permit reduction of any mismatch in thermal expansion coefficients (CTE) across an material interface located near a leading edge. Ideally, this material would permit the thermal protection configuration to be used more than once, with at most minor re-processing or material replacement.

SUMMARY OF THE INVENTION

These needs are met by the invention, which in one embodiment provides a functional gradient of a third material, located at or adjacent to an interface between first and second materials that have substantially different thermal expansion coefficients, CTE1 and CTE2. The functional gradient configuration and mass fraction of the third material are chosen so that presence of this material does not adversely affect emittance of the combined first and second materials when the third material is present. The third material is a combination of alumina ($Al_2O_3$), boria ($B_2O_3$) and silica ($SiO_2$) in a limited range of mass fractions of each, provided as a powder or as a solid suspension and dispersed with varying mass fractions in different regions of at least one of the first and second materials.

DESCRIPTION OF THE INVENTION

Figure 1:
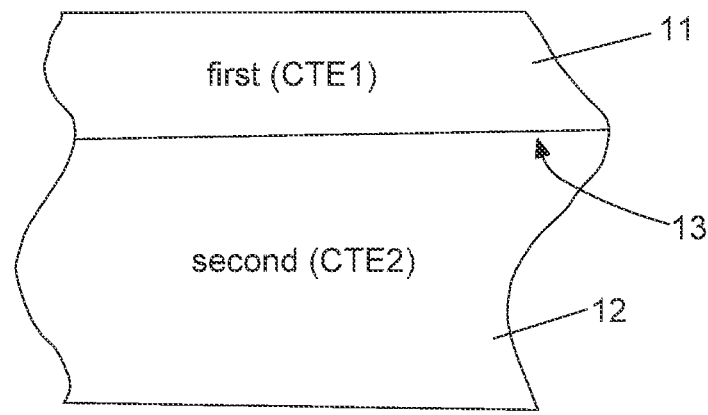
FIG. 1 is a schematic view of a conventional configuration of a material assembly.

Consider an assembly of adjacent, metal-like first material 11 and second material 12 in FIG. 1, which have coefficients of thermal expansion, CTE1 and CTE2, respectively, that are substantially different from each other; for example, reaction cured glass (RCG) with CTE1=$0.48 \times 10^{-6}$ cm/cm-° F. and ROCCI with CTE2=$(4.9 \text{ to } 6) \times 10^{-6}$ cm/cm-° F. Preparation of ROCCI is disclosed in U.S. Pat. No. 6,225,248, issued to Leiser et al. and incorporated by reference herein. In the assembly of first and second layer materials in FIG. 1, the first material serves as an overcoat to prevent exposure of the second material to oxygen in the ambient atmosphere. When the temperature of the overcoat reaches about T=3200° F., at or near an interface 13, the associated thermal expansion mismatch between the first and second materials will be about $1.6 \times 10^{-2}$ cm/cm, which will induce thermal stresses that may cause the first and second materials to separate at or near the interface. This will, in turn, allow oxidization of the second material, substantial changes in thermal dissipation, and/or in thermal re-distribution of high temperature fields.

Figure 2:
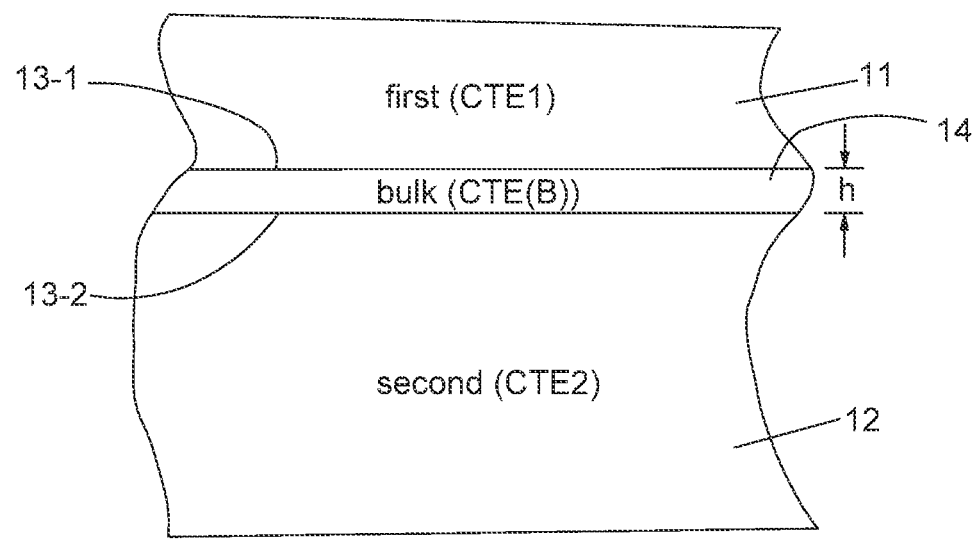
FIGS. 2, 3, 4, 5, and 6 are graphical views of five density distributions of an additive material according to the invention.

Insertion of a bulk material (B) 14 at the interface 13 in FIG. 1 between the first and second material is illustrated in FIG. 2, with coefficient of thermal expansion CTE(B) satisfying $$(CTE(B)-CTE1)(CTE(B)-CTE2)<0, \quad (1)$$

which subsumes and is consistent with each of the two inequality relations $$CTE1<CTE(B)<CTE2, \quad (2A)$$

$$CTE2<CTE(B)<CTE1, \quad (2B)$$

Either of the inequality relations in Eqs. (2A) and/or (2B) would reduce the CTE mismatch at each interface, 13-1 and 13-2, if the bulk material has sufficient thickness. However, introduction of the bulk material of substantial thickness at this location may cause the bulk material layer to separate from one or both of the first layer material 11 and/or second layer material 12 at very high temperatures, or under conditions of thermal cycling. Further, if the bulk material layer has a much smaller emittance (radiation transparency) than does the first material (e.g., overcoat layer), the resulting substantial decrease in emittance for the combination will likely cause the internal temperature of the first material layer and/or the second material layer to increase above what would otherwise occur in the absence of the bulk layer. This approach to reducing the CTE mismatch may be made to work if the bulk layer thickness can be made small enough. At sufficiently high temperatures, a small portion of the first layer material and the bulk material will diffuse across the first layer/bulk layer interface 13-1 into each other, and a small portion of the second layer material and/or the bulk material will diffuse across the second layer/bulk layer interface 13-2 into each other.

Figure 3:
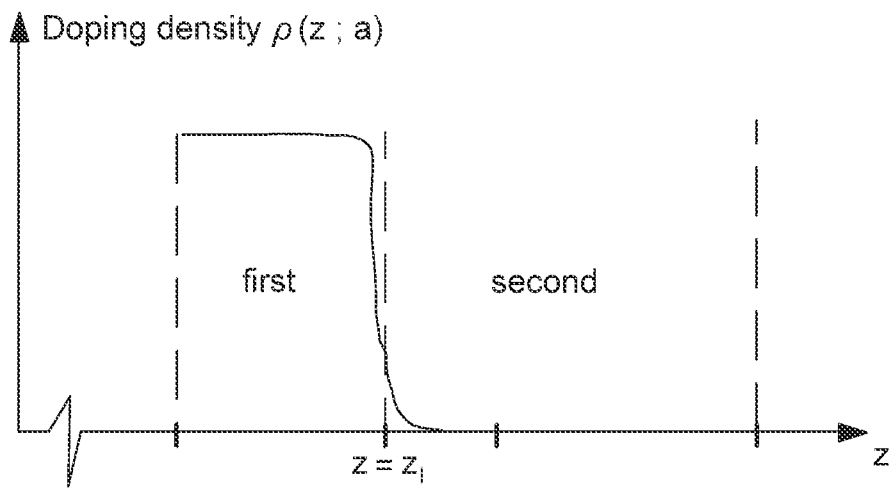

In a second approach, illustrated graphically in FIG. 3, expressed in terms of a depth coordinate z, the CTE of the first layer (e.g., overcoat) is varied by adding to this first layer ($z<z_I$) an additive with an approximately uniform numerical additive density $\rho(z;a)$ at locations spaced apart from the interface, $z=z_I$, where the additive density $\rho(z;a)$ decreases abruptly toward 0 as one approaches the interface, $z=z_I$, within the first layer, corresponding to increasing depth coordinate z, measured from an exposed surface. The first and second layer materials and (pure) additive have coefficients of thermal expansion, CTE1, CTE2 and CTE(a), satisfying $$(CTE(a)-CTE1)(CTE(a)-CTE2)<0, \quad (3)$$

and the combination has an ability to withstand very high temperatures, T≈3200° F., for time intervals of length, up to Δt≈300-600 sec. The second layer, $z>z_I$, is substantially unmodified, except for modest diffusion of first layer material and additive into the second layer. The density $\rho(z;a)$ of the additive material is preferably chosen so that the CTE coefficient for the additive material, CTE(a), is appreciably higher than CTE1 (≥CTE2), or inversely, for example, $$CTE(a)=(1+b)CTE1/2 \quad (4)$$

where b is a selected value greater than 1. Positioning the modified first layer material contiguous to the (initially unmodified) second layer material will permit some of the additive material in the first layer to diffuse into the second layer material in a relatively thin layer adjacent to the interface $z≈z_I$, when the interface temperature is sufficiently high. This will cause CTE1 and CTE2 adjacent to the interface to move closer to CTE(a), and should result in a net decrease in the CTE mismatch, |(CTE2−CTE1)|, across the interface.

At sufficiently high temperatures, a small amount of the first layer material and/or the additive material will diffuse across the interface into the second layer material, and a small amount of the second layer material will counter-diffuse across the interface in the opposite direction, into the first layer material. This will produce some changes in the local net CTE value, CTE(z;net), at and near the interface, $z=z_I$. Note that, with an appropriate choice of additive density $\rho(z;a)$ and with diffusion and counter-diffusion accounted for, the local value CTE(z;net) may change monotonically and continuously at and near the interface so that an abrupt CTE mismatch is substantially reduced or does not occur.

Figure 4:
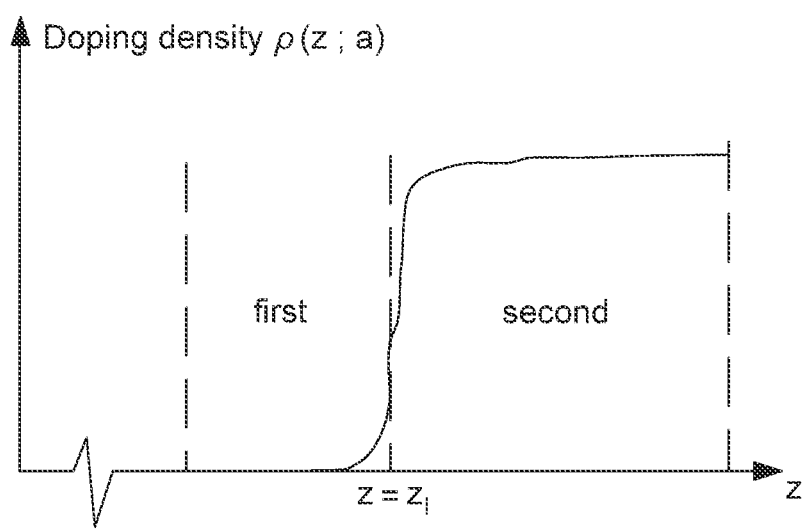

This qualitative result can also be achieved in a third approach, illustrated graphically in FIG. 4 in terms of depth coordinate z. The CTE of the second layer is varied by adding to this second layer an additive with an approximately uniform density, $\rho(z;a)$, at locations spaced apart from the interface, $z=z_I$, with density decreasing abruptly toward 0 as one approaches the interface within the second layer. Before such modification, the pure first and second layer materials and the additive material have coefficients of thermal expansion, CTE1, CTE2 and CTE(a), satisfying Eq. (3). The first layer is substantially unmodified, except for diffusion and counter-diffusion of the various materials across the interface. The combined first layer and (modified) second layer should have an ability to withstand very high temperatures, up to T≈3200° F., for time intervals of length, up to Δt≈300-600 sec. The numerical density $\rho(z;a)$ of the additive material is preferably chosen so that the CTE(a) coefficient for the modified material is appreciably higher than CTE2 (>CTE1), or inversely.

At sufficiently high temperatures, a small amount of the second layer material and/or the additive material will diffuse across the interface into the first layer material, and a small amount of the first layer material will counter-diffuse across the interface in the opposite direction, into the second layer material. This will produce some changes in the local net CTE value, CTE(z;net), at and near the interface, as illustrated in FIG. 4. Again, with an appropriate choice of additive distribution $\rho(z;a)$ and with diffusion and counter-diffusion accounted for, the local CTE value CTE(z;net) may change monotonically and continuously at and near the interface so that CTE mismatch is substantially reduced or does not occur.

In each of the second and third approaches, the emittance of the unmodified first layer material and/or the unmodified second layer material are not appreciably affected by introduction of the additive. These approaches will cause CTE1 and CTE2 adjacent to the interface to move closer to CTE(a), and will likely result in a net decrease in the CTE mismatch, |CTE2−CTE1|, across the interface. At high temperatures, some of the additive material in the first layer will diffuse into the second layer material, as in the second approach.

Figure 5:
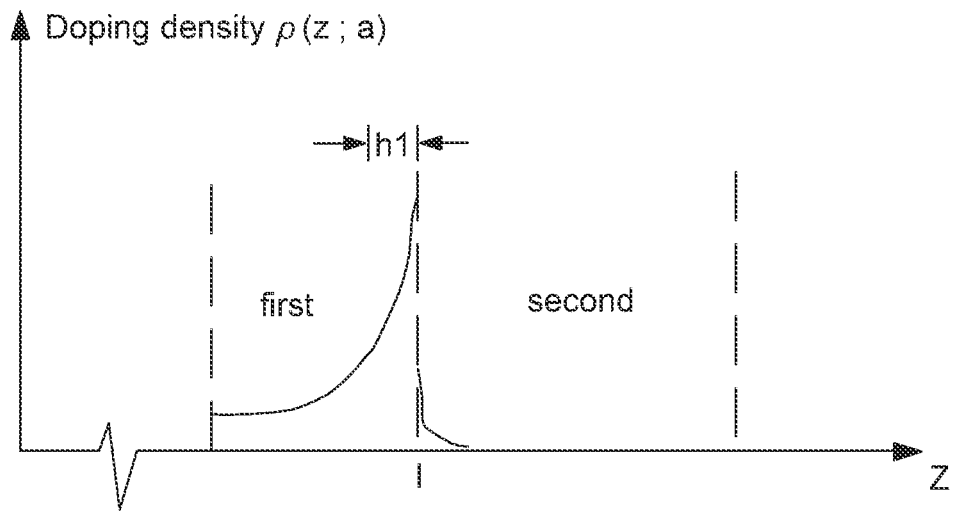

In a fourth approach, illustrated graphically in FIG. 5, the additive is distributed as a functional gradient (non-uniformly) in the first layer material, with additive density $\rho(z;a)$ increasing sharply as one approaches the interface within the first layer and decreasing abruptly toward 0 as one moves into the second layer material and away from the interface, as shown graphically in FIG. 5. With the distribution $\rho(z;a)$ of additive as shown in FIG. 5, the local CTE(z;net) value will increase monotonically as one moves toward the interface in the first layer material.

Figure 6:
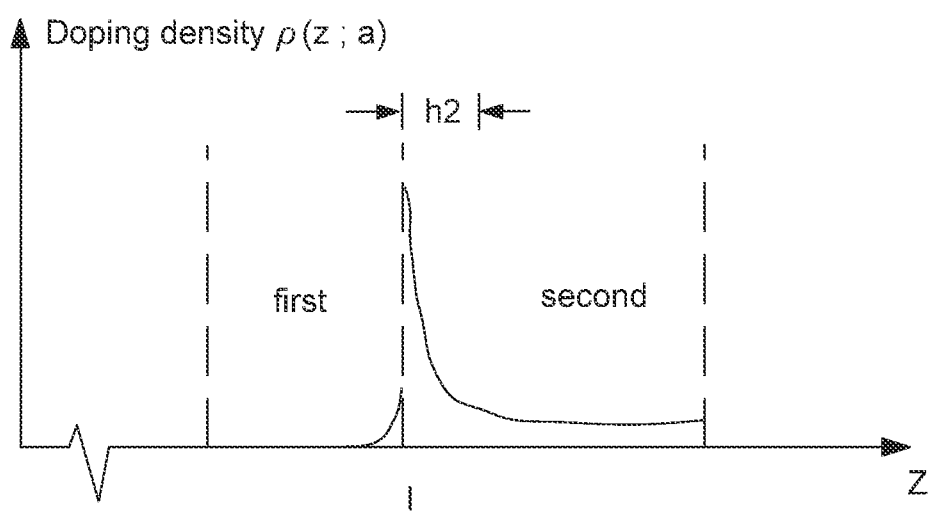

In a fifth approach, illustrated graphically in FIG. 6, the additive material is distributed as a functional gradient (non-uniformly) in the second layer material, with additive density $\rho(z;a)$ increasing sharply as one approaches the interface in the second layer and decreasing abruptly toward 0 as one moves into the first layer material and away from the interface, as shown graphically in FIG. 6. With the distribution $\rho(z;a)$ of additive as shown in FIG. 6, the local CTE(net) value will increase monotonically as one moves toward the interface in the second layer material. In any of FIGS. 2-6, a maximum density (mass or volume fraction) of the additive preferably lies in a range 0.5-40 percent of total density, with smaller amounts preferred.

The additive density $\rho(z;a)$ and an associated additive thickness near the interface are preferably chosen in FIGS.

5 and 6 so that (1) any net decrease in emittance in the first layer and/or in the second layer is relatively small and (2) the CTE mismatch of the additive layer thickness with the first layer material is reduced relative to the original CTE mismatch, |CTE2−CTE1|. At high temperatures, some of the additive material in a material layer will diffuse into an adjacent layer material, as in the third and fourth approaches discussed above.

Figure 7:
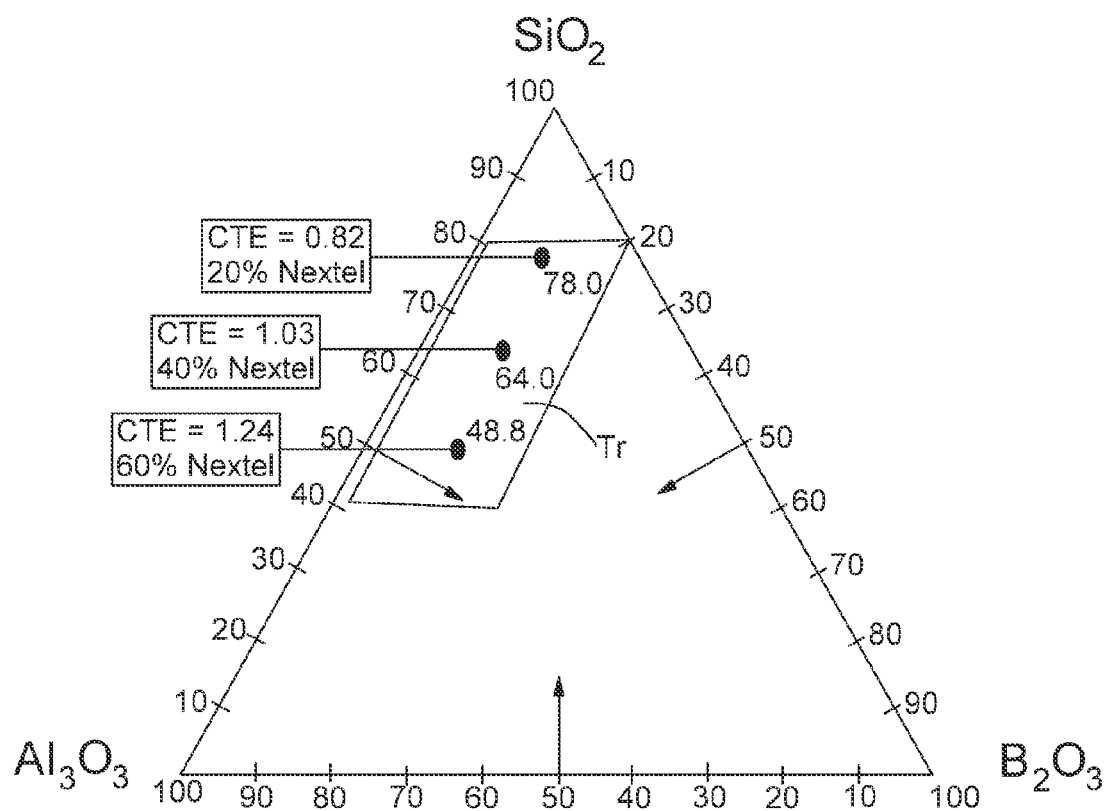
FIGS. 7 and 8 are compositional diagrams of modified RCG and modified HETC, respectively, incorporating different amounts of abs.

FIG. 7 is a material composition diagram of modified RCG, including a supplement of aluminum borosilicate ("abs"), which includes selected fractions, f1, f2 and f3, of alumina ($Al_2O_3$), boria ($B_2O_3$) and silica ($SiO_2$), respectively. The ranges of fractions, f1, f2 and f3, of primary interest here for the alumina, boria and silica are indicated in a trapezoid Tr that extends over fractions $0.4 \leq f1(Al_2O_3) \leq 0.8$, $0.2 \leq f2(B_2O_3) \leq 0.6$ and $0.4 \leq f3(SiO_2) \leq 0.8$. The abs is used as a bulk material or as an additive material in any of the five approaches illustrated in FIGS. 2-6. The first and second materials in these approaches are reaction cured glass (RCG) and ROCCI, respectively, in one example, but may be any two materials with pure material CTE values that differ substantially at high temperatures (T>2000° F.).

The emittance of RCG is about 0.9, and it is estimated that the emittance of RCG, modified with a mass fraction of 40 percent abs, is about 0.8–0.85. Using the second approach (FIGS. 3 and 4), discussed in the preceding, with a mass fraction of 40 percent abs with 50 percent silica and 50 percent alumina-plus-boria, the thermal mismatch at an RCG/ROCCI interface is estimated to be about $1.36 \times 10^{-2}$ cm/cm-° F. at T=3200° F., as compared with $1.6 \times 10^{-2}$ cm/cm for an unmodified configuration of first layer and second layer materials (a 15 percent reduction).

The CTE for abs ranges from about $0.62 \times 10^{-6}$ cm/cm-° F. (pure silica; an approximation for RCG, which is 95 percent silica), to $0.82 \times 10^{-6}$ cm/cm-° F. (0.8 silica), to $1.24 \times 10^{-6}$ cm/cm-° F. (0.5 silica), to $1.67 \times 10^{-6}$ cm/cm-° F. (0 silica; 100 percent combined alumina-plus-boria). Using the triangular grid displayed in FIG. 8, one can estimate the CTE for abs for any combination of alumina, boria and silica by assuming, as a first approximation, that the CTE depends only upon the mass fraction of $SiO_2$ and upon the combined mass fraction of $Al_2O_3$ and $B_2O_3$. This is not entirely correct, because pure boria has a modestly lower CTE than does alumina, but is useful as a first approximation. Where boron or boria is lost as a result of operation at high temperatures, it is anticipated that the CTE of abs will increase.

Table 1 presents some constituent properties (density, CTE) for $TaSi_2$, $MoSi_2$, aluminum borosilicate (abs, also referred to as "Nextel 312"), $SiB_4$, $Si_6$ and Frit 7930 glass, used in various formulations of the invention.

TABLE 1

Constituent Properties.

| Constituent | Density (gm/cm³) | CTE (× $10^{-6}$ cm/cm-° F.) |
|---|---|---|
| $TaSi_2$, | 6.0 | 9.14 |
| $MoSi_2$ | 4.9 | 6.3 |
| Abs (Nextel) | 2.6 | 1.67 |
| $SiB_{4,6}$ | 2.43 | 3.0 |
| Frit 7930 | 2.2 | 0.58 |

FIG. 7 is a compositional diagram for modified RCG, including 20 percent, 40 percent and 60 percent by volume of Nextel 312, with calculated CTE values (based on relative volume fractions) of the modified material of CTE(0.2)=0.82, CTE(0.4)=1.03, and CTE(0.6)=1.24, all corresponding to an $Al_2O_3/B_2O_3$ ratio of about 90/10.

Figure 8:
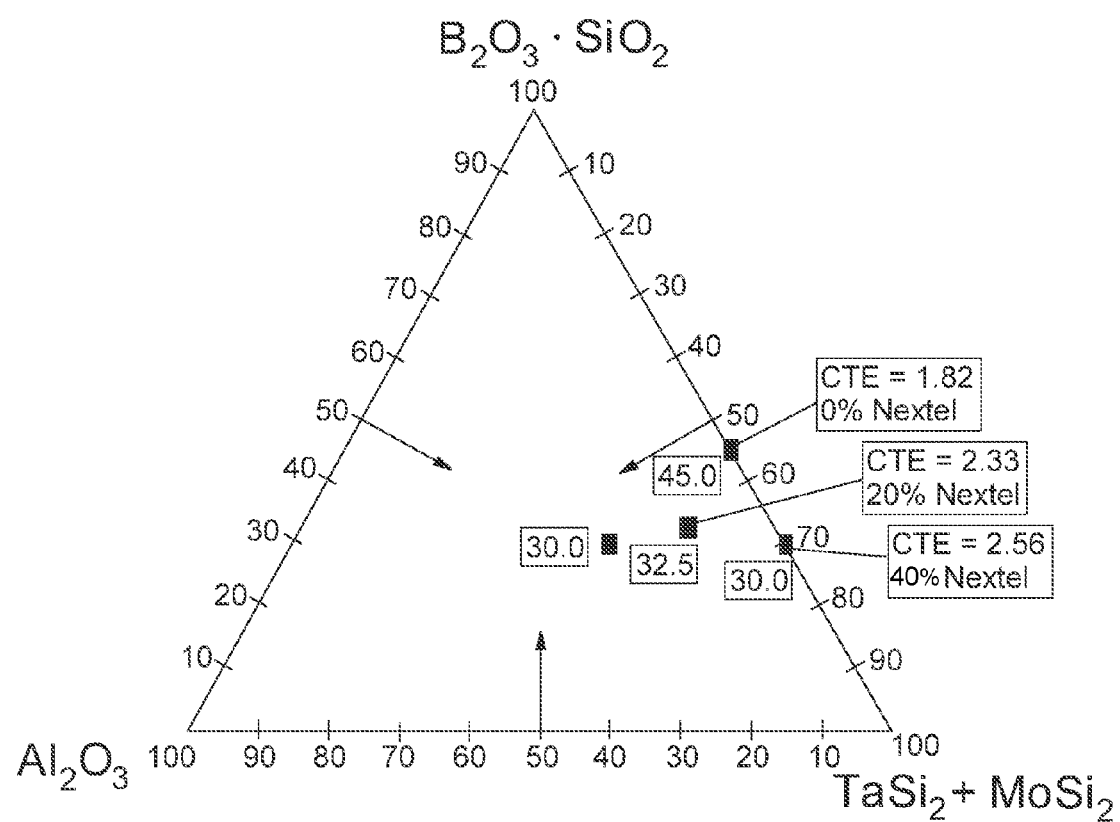

FIG. 8 is a compositional diagram for modified HETC (disclosed in U.S. Pat. No. 7,767,305, issued to Stewart et al and incorporated by reference herein), which includes $Al_2O_3$, $B_2O_2 \cdot SiO_2$, and $TaSi_2 + MoSi_2$, including 0 percent, 20 percent and 40 percent by volume of Nextel 312, with calculated CTE values (based on relative volume fractions) of CTE(0.0)=1.82, CTE(0.2)=2.33 and CTE(0.4)=2.56.

The preceding development has focused on particular configurations of aluminum borosilicate, referred to collectively herein as "abs." or as "Nextel 312," with a representative composition $\{Al_2O_3, SiO_2, B_2O_3\}=\{62.5\%, 24.5\%, 13\%\}$ (mass fractions). Nextel is available in at least four configurations, 440, 550, 610 and 720, in addition to Nextel 312. For example, Nextel 440 comprises the fractions $\{Al_2O_3, SiO_2, B_2O_3\}=\{70\%, 28\%, 2\%\}$, Nextel 550 comprises the fractions $\{Al_2O_3, SiO_2, B_2O_3\}=\{73\%, 23\%, 0\%\}$, Nextel 610 comprises the fractions $\{Al_2O_3, SiO_2, B_2O_3\}=\{>99\%, \approx 0\%, \approx 0\%\}$, and Nextel 720 comprises the fractions $\{Al_2O_3, SiO_2, B_2O_3\}=\{85\%, 15\%, 0\%\}$. The radiation emittance parameter $\epsilon$ of Nextel products other than 312 is generally lower than the emittance parameter for Nextel 312, for which $\epsilon(add)=0.8-0.85$. A suitable emittance parameter for the additive $e(add)$ should be close to the (preferred) emittance parameter for RCG, $\epsilon(pref)=0.9$ (e.g., at least 89 percent of $\epsilon(pref)$).

Where high temperatures (e.g., T=2800–3200° F. or higher), are present, it is preferable to include at least a modest amount of boron, as boron nitride, boric acid or boria, in order to provide and preserve reasonably high emittance values for the compound. The low temperature emittance of RCG, with or without Nextel included, is often "grey" initially, with associated emittance values of the order of 0.7–0.8. After the compound is exposed to high temperatures (T≥2800° F.), RCG becomes more transparent, and the emittance value of RCG increases to as high as 0.9. One concern here is loss of boron at higher temperatures, especially boron bound with oxygen, which can result in loss of high emittance values already achieved in the compound. Where boria can be bound with alumina, boron loss at higher temperatures can be reduced. Boron loss can also be partly compensated by providing $SiB_4$ or $SiB_6$ as a processing agent or emittance agent in modest amounts.

For temperatures $T(max) \approx 3200°$ F. that are maintained for time intervals, of length up to $\Delta t(max)=300-600$ sec, or longer, Nextel 312, with its reasonably high emittance, is often a preferred choice for an additive material. However, if T(max) is substantially lower than 3200° F. (for example, T(max)=2000–2800° F.), other Nextel products (440, 550, 650, 710), as well as additives other than Nextel, may also be used with the additive density configurations illustrated in FIGS. 2-6. Three parameters of primary interest here are T(max), $\Delta t(max)$ and emittance $\epsilon(add)$ at or near the maximum temperature. As T(max) and/or $\Delta t(max)$ decrease, the required emittance values $\epsilon$ may also decrease (slowly).

What is claimed is:
1. A thermal protection system that reduces a mismatch of coefficients of thermal expansion ("CTEs") across an interface between first and second materials, the system comprising:
    a first material, having an undoped CTE value CTE1, the first material having distal and interface surfaces;
    a second material having an undoped CTE value CTE2 where CTE2 is greater than CTE1, the second material having distal and interface surfaces, wherein the inter- face surface of the second material is disposed adjacent to the interface surface of the first material;

additive material particles having a CTE value CTE(add) dispersed within said first and second materials along a density gradient where the dispersion density of the additive material particles changes within the first and second materials from the distal surfaces to the interface surfaces, where (CTE(add)−CTE1)(CTE(add)−CTE2)<0, and CTE1<CTE(add)<CTE2, wherein the dispersion density of the additive material particles increases within the first and second materials from the distal surfaces to the interface surfaces.

2. The system of claim 1, wherein said additive material particles have at least one of said particles with average compositions of $p(Al_2O_3)$ percent $Al_2O_3$, $p(B_2O_3)$ percent $B_2O_3$, and $p(SiO_2)$ percent of $SiO_2$, where a sum $p(Al_2O_3)+p(B_2O_3)+p(SiO_2)$ is approximately equal to 100 percent.

3. The system of claim 2, wherein a sum $p(Al_2O_3)+p(B_2O_3)$ lies in a range of 72-100 percent.

4. The system of claim 2, wherein said value $p(SiO_2)$ lies in a range of 0-28 percent.

5. The system of claim 1, wherein said first material comprises reaction cured glass (RCG).

6. The system of claim 1, wherein said second material comprises ROCCI.

7. The system of claim 1, wherein said additive material particles comprise at least one of
- a first configuration of aluminum borosilicate with a representative composition of $Al_2O_3$, $SiO_2$, and $B_2O_3$ having mass fractions of 62.5%, 24.5%, and 13% respectively,
- a second configuration of aluminum borosilicate with a representative composition $Al_2O_3$, $SiO_2$, and $B_2O_3$ having mass fractions of 70%, 28%, and 2% respectively,
- a third configuration of aluminum borosilicate with a representative composition of $Al_2O_3$, $SiO_2$, and $B_2O_3$ having mass fractions of 73%, 23%, and 0% respectively,
- a fourth configuration of aluminum borosilicate with a representative composition of $Al_2O_3$, $SiO_2$, and $B_2O_3$ having mass fractions of >99%, ≈0%, and ≈0% respectively, and
- a fifth configuration of aluminum borosilicate with a representative composition of $Al_2O_3$, $SiO_2$, and $B_2O_3$ having mass fractions of 85%, 15%, and 10% respectively.

8. A thermal protection system that reduces a mismatch of coefficients of thermal expansion ("CTEs") across an interface between first and second materials, the system comprising:
- a first material, having an undoped CTE value CTE1, the first material having distal and interface surfaces;
- a second material having an undoped CTE value CTE2 where CTE2 is greater than CTE1, the second material having distal and interface surfaces, wherein the interface surface of the second material is disposed adjacent to the interface surface of the first material;
- additive material particles having a CTE value CTE(add) dispersed within said first and second materials along a density gradient where the dispersion density of the additive material particles changes within the first and second materials from the distal surfaces to the interface surfaces, where (CTE(add)−CTE1)(CTE(add)−CTE2)<0, and CTE1<CTE(add)<CTE2, wherein the dispersion density of the additive material particles decreases within the first and second materials from the distal surfaces to the interface surfaces.

9. The system of claim 8, wherein said additive material particles have at least one of said particles with average compositions of $p(Al_2O_3)$ percent $Al_2O_3$, $p(B_2O_3)$ percent $B_2O_3$, and $p(SiO_2)$ percent of $SiO_2$, where a sum $p(Al_2O_3)+p(B_2O_3)+p(SiO_2)$ is approximately equal to 100 percent.

10. The system of claim 9, wherein a sum $p(Al_2O_3)+p(B_2O_3)$ lies in a range of 72-100 percent.

11. The system of claim 9, wherein said value $p(SiO_2)$ lies in a range of 0-28 percent.

12. The system of claim 8, wherein said first material comprises reaction cured glass (RCG).

13. The system of claim 8, wherein said second material comprises ROCCI.

14. The system of claim 8, wherein said additive material particles comprise at least one of
- a first configuration of aluminum borosilicate with a representative composition of $Al_2O_3$, $SiO_2$, and $B_2O_3$ having mass fractions of 62.5%, 24.5%, and 13% respectively,
- a second configuration of aluminum borosilicate with a representative composition $Al_2O_3$, $SiO_2$, and $B_2O_3$ having mass fractions of 70%, 28%, and 2% respectively,
- a third configuration of aluminum borosilicate with a representative composition of $Al_2O_3$, $SiO_2$, and $B_2O_3$ having mass fractions of 73%, 23%, and 0% respectively,
- a fourth configuration of aluminum borosilicate with a representative composition of $Al_2O_3$, $SiO_2$, and $B_2O_3$ having mass fractions of >99%, ≈0%, and ≈0% respectively, and
- a fifth configuration of aluminum borosilicate with a representative composition of $Al_2O_3$, $SiO_2$, and $B_2O_3$ having mass fractions of 85%, 15%, and 10% respectively.

* * * * *